Patented Aug. 19, 1924.

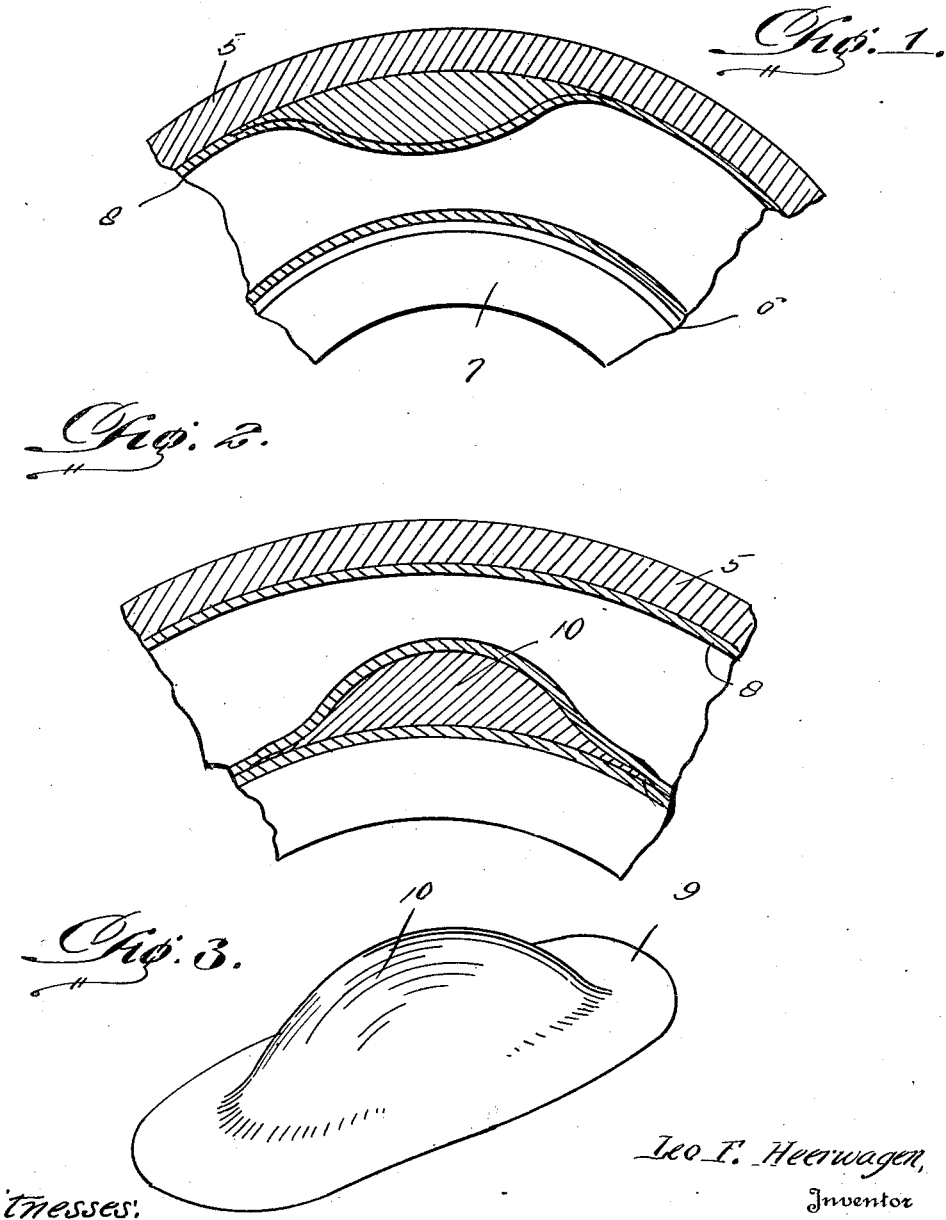

1,505,784

UNITED STATES PATENT OFFICE.

LEO F. HEERWAGEN, OF FAYETTEVILLE, ARKANSAS.

LOW-AIR-PRESSURE DETECTOR AND SIGNAL IN TIRES.

Application filed September 20, 1923. Serial No. 663,746.

*To all whom it may concern:*

Be it known that I, LEO F. HEERWAGEN, a citizen of the United States, residing at Fayetteville, in the county of Washington and State of Arkansas, have invented certain new and useful Improvements in Low-Air-Pressure Detectors and Signals in Tires, of which the following is a specification.

In carrying out the present invention, it is my purpose to provide a means adapted for insertion or construction within a tire between the casing and the inner tube or tube and rim for effectively indicating to the operator of the motor vehicle upon which the tire is applied when the same has become totally or partially deflated and thereby hinder the running of the vehicle while said tire is partly or totally deflated.

The primary object of the invention resides in the provision of such an alarm that includes a means adapted for positioning between the casing and inner tube or tube and rim that is extremely simple of construction and one that may be manufactured and marketed at extremely small cost and may be placed in position in a novel, simple and expeditious manner or possibly built into the casing or tube.

Briefly described, this means comprises a suitably shaped block of flexible rubber or some flexible material that may be positioned within the casing above or below the inner tube for consequently effecting the bumping of the machine whenever the tires become totally or partially deflated for consequently giving the alarm.

Numerous advantages of a pneumatic tire alarm of this character will be apparent as the nature of the invention is better understood, the same comprising the novel form and construction set forth in the following detailed specification, shown in the accompanying drawing and claimed.

In the drawing, wherein like reference characters indicate corresponding parts throughout the several views, Figure 1 is a fragmentary cross section through a pneumatic tire equipped with my novel alarm means.

Figure 2 is a view similar to Figure 1 with the alarm means shown as positioned differently from that in Figure 1, and Figure 3 is a perspective of the alarm means per se.

In the drawing wherein there is shown the most practical embodiment of my invention, 5 designates an ordinary casing of a pneumatic tire for positioning upon the rim 6 of a vehicle wheel 7, and 8 the usual inner tube for said casing 5.

My invention per se embodies the provision of a strip of flexible material 9 preferably of rubber and of oval or any advantageous shape as shown, formed centrally with a hump portion 10 of suitable height.

It is of importance in the construction of the hump portion 10 that the contour of the portion engaging the inner tube having substantially long cured surfaces extending from the thick portion 10' in all directions merging into a relatively thin flanged portion 11 which tapers from its inner portion at the juncture with the hump 10 to a sharp edge portion as indicated at 12. This structure provides for flexibility of the edge portions of the member for adapting it to fit the contour of the tire or tire and rim in which it is placed, in order that sharp curves and bends in the inner tube overlying this member are presented for eliminating pinching or crushing of the inner tube in the use of this invention.

In Figure 1 this alarm means is shown as positioned between the casing 5 and top side of said inner tube 8 while in Figure 2 the same is shown as positioned between the lower side of said tube and the rim 6, it being obvious that when the tire becomes either totally or partially deflated an obstruction will be provided within the tire for consequently causing the bumping of the machine and calling the attention of the operator thereof, to the fact that his tire needs inflating.

Numerous advantages of a device of this character will be at once appreciated by the owners of motor vehicles employing pneumatic tires, and even though I have herein set forth the most practical embodiment of the invention with which I am at the present time familiar, it is nevertheless to be understood that minor changes may be made therein without departing from the spirit and scope of the appended claim.

Having thus described my invention, what I claim as new and desire to secure by Letters Patent is:—

The combination with a pneumatic tire, of a resilient body inserted between the tube and the casing, being of substantially elongated form and of maximum thickness at the center, gradually tapering, and of reduced thickness toward the edge portion, and an integral flange of substantially thin wide form, extending from the edge portion of the body to provide a securing flange adapted to be held between the tube and casing for holding the body in place in the tire.

In testimony whereof I affix my signature.

LEO F. HEERWAGEN.